United States Patent
Giltinan

Patent Number: 5,348,334
Date of Patent: Sep. 20, 1994

[54] SUSPENSION APPARATUS FOR A MOTOR VEHICLE

[75] Inventor: Paul J. Giltinan, Dearborn, Mich.

[73] Assignee: Ford Motor Company, Dearborn, Mich.

[21] Appl. No.: 102,936

[22] Filed: Aug. 6, 1993

[51] Int. Cl.$^5$ ............................................. B60G 3/00
[52] U.S. Cl. ................................. 280/691; 280/675; 280/660
[58] Field of Search ............... 280/691, 675, 666, 660, 280/663, 693, 696, 701, 692

[56] References Cited

U.S. PATENT DOCUMENTS

| | | | |
|---|---|---|---|
| 3,115,349 | 12/1963 | Leg | 280/96.2 |
| 3,139,275 | 6/1964 | Burkitt | 267/20 |
| 3,193,304 | 7/1965 | Behlke | 280/124 |
| 3,642,084 | 2/1972 | Takahashi | 180/43 R |
| 3,883,152 | 5/1975 | de Carbon | 280/666 |
| 4,313,619 | 2/1982 | Hailer | 280/691 |
| 4,509,772 | 4/1985 | Drotar et al. | 280/661 |
| 4,819,959 | 4/1989 | Inoue et al. | 280/660 |
| 4,863,188 | 9/1989 | Killian | 280/675 |
| 4,878,688 | 11/1989 | Kubo | 280/693 |
| 4,943,081 | 7/1990 | Golpe | 280/666 |
| 5,026,091 | 6/1991 | Lee | 280/675 |
| 5,048,860 | 9/1991 | Kanai et al. | 280/675 |
| 5,080,388 | 1/1992 | Berry | 280/661 |
| 5,193,843 | 3/1993 | Yamamoto et al. | 280/675 |
| 5,236,209 | 8/1993 | Lopiccolo | 280/663 |

Primary Examiner—Brian L. Johnson
Assistant Examiner—Christopher P. Ellis
Attorney, Agent, or Firm—Raymond L. Coppiellie; Roger L. May; Gregory P. Brown

[57] ABSTRACT

A suspension apparatus for a motor vehicle having a chassis, and a steerable wheel and tire assembly rotatably supported on a tall knuckle. The tall knuckle is pivotally connected to the chassis by a single upper control arm, a tension strut and a lateral link, each being independently pivotally attached to the knuckle.

18 Claims, 2 Drawing Sheets

SUSPENSION APPARATUS FOR A MOTOR VEHICLE

BACKGROUND OF THE INVENTION

1. Field of the Invention

The present invention relates to suspension systems for motor vehicles. More specifically, the present invention relates to a suspension system for a steerable wheel which increases adjustability of performance characteristics.

2. Disclosure Information

In a conventional suspension system for a motor vehicle having a steerable wheel and tire assembly, the wheel is rotatably supported on a spindle which extends from a knuckle. Typically an upper and a lower control arm pivotally interconnect the knuckle to a chassis. A single ball joint pivotally connects the upper arm to the upper portion of the knuckle and a single ball joint pivotally connects the lower arm to the lower portion of the knuckle. This configuration allows both steerable motion of the wheel in the horizontal plane of the vehicle, and jounce and rebound motion in the vertical plane of the vehicle.

In such a suspension system, a line extending from the upper ball joint to the lower ball joint defines a "kingpin" axis. Orientation of the kingpin axis defines certain operational characteristics of the suspension. In designing a suspension system as described above, the placement of the kingpin axis is limited by the package space available for the arms. Space for the upper and lower arms must be shared with other components, including the engine, brake hardware, spring and shock absorber assembly, and supporting chassis structure.

One solution providing greater design flexibility for locating the kingpin axis is shown in U.S. Pat. No. 4,878,688. This patent discloses a suspension system providing an upper pair of lateral links and a lower pair of lateral links. Each link attaches to the knuckle with a separate ball joint. Utilizing ball joints this way creates an instant center of velocity located at the intersection of coaxial lines extended along the longitudinal axis of each of the independent links. The instant center is an imaginary point that does not have physical package constraints, thereby obviating to some extent the packaging restrictions imposed by neighboring componentry. The kingpin axis for such a system is defined by connecting a straight line through the instant centers. This flexibility does allow designers to orient the kingpin axis to pass througth the center of the wheel, thereby providing zero kingpin offset, and still provides a negative scrub radius at the contact patch. While this system does allow the kingpin axis to be defined where packaging space otherwise would not allow it, the system presents several objectionable characteristics. First, the system is costly. Each ball joint used adds significantly to the cost of the suspension. Second, steering system sensitivity to undesirable force variations is increased. Third, the kingpin orientation is overly susceptible to manufacturing tolerance variations in both the upper arm to chassis mounts, and to the upper arm construction and installation.

It would be desirable to have a suspension system that would allow greater flexibility for orienting the kingpin axis that simultaneously overcomes the deficiency of the prior art. Specifically, it would be desirable to provide an uncomplicated, low cost, lightweight suspension while reducing the sensitivity of the steering system to undesirable vibrations.

SUMMARY OF THE INVENTION

The present invention advances beyond the above described systems by providing a suspension for a motor vehicle, the apparatus being interposed and connecting a chassis to a steerable wheel and tire assembly. The suspension apparatus comprises a tall knuckle having an upper end and a lower end. The knuckle being operative to rotatably support the wheel and tire assembly. The suspension also includes a single upper control arm pivotally interposed between the chassis and the upper end of the knuckle. The arm includes an outer arm end and an inner arm end. The apparatus further includes a tension strut pivotally interposed between the chassis and the lower end of the knuckle. The strut includes an outer strut end and an inner strut end, the strut extending laterally and rearwardly from the chassis to the knuckle so as to form a predetermined angle between the strut and the longitudinal axis of the vehicle. The apparatus further includes a lateral link pivotally interposed between the chassis and the lower end of the knuckle. The link includes an outer link end and an inner link end, the link extending from the chassis to the knuckle substantially parallel to the transverse axis of the vehicle as projected both in the horizontal and transverse planes.

It is an advantage of the present invention to provide a low cost, lightweight suspension design that provides greater packaging flexibility and improved performance characteristics, including zero kingpin offset and negative scrub radius while maintaining sufficient self-aligning torque to self-center the steering wheel after steering manuevers thereby maintaining straight line tracking of the vehicle.

Other objects, features and advantages of the present invention will become apparent to those skilled in the art from the drawings, detailed description and claims which follow.

DETAILED DESCRIPTION OF THE PREFERRED EMBODIMENTS

Figure 1:
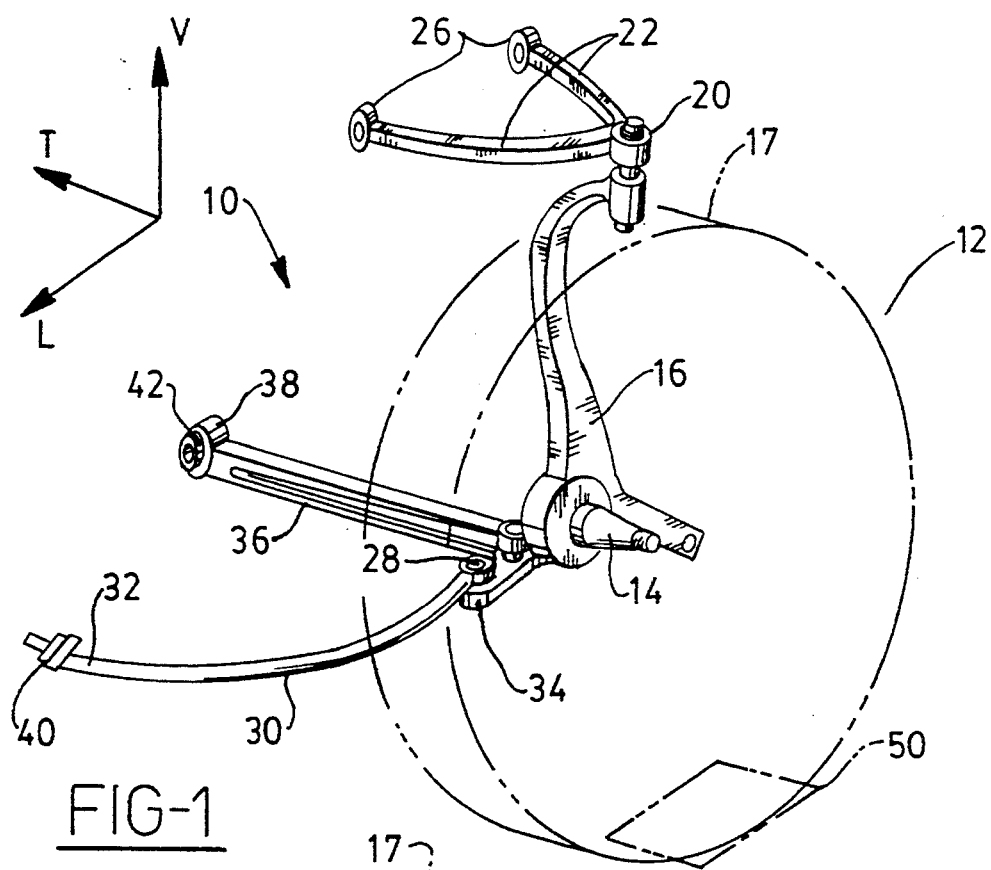
FIG. 1 is a perspective view of a motor vehicle steerable suspension according to the present invention.

Referring now to FIG. 1, a steerable suspension 10 in accordance with the present invention is shown as applied to a front wheel and tire assembly 12 of a motor vehicle. The following description is limited to the left side of the vehicle, it being understood that the right side is symmetrically opposite. The vehicle has longitudinal, transverse and vertical axes, each being mutually perpendicular as shown in FIG. 1 by lines L—L, T—T, and V—V, respectively. The wheel and tire assembly 12 are rotatably supported by a spindle 14 which protrudes outwardly from a knuckle 16 that is pivotally connected to a chassis.

Figure 3:
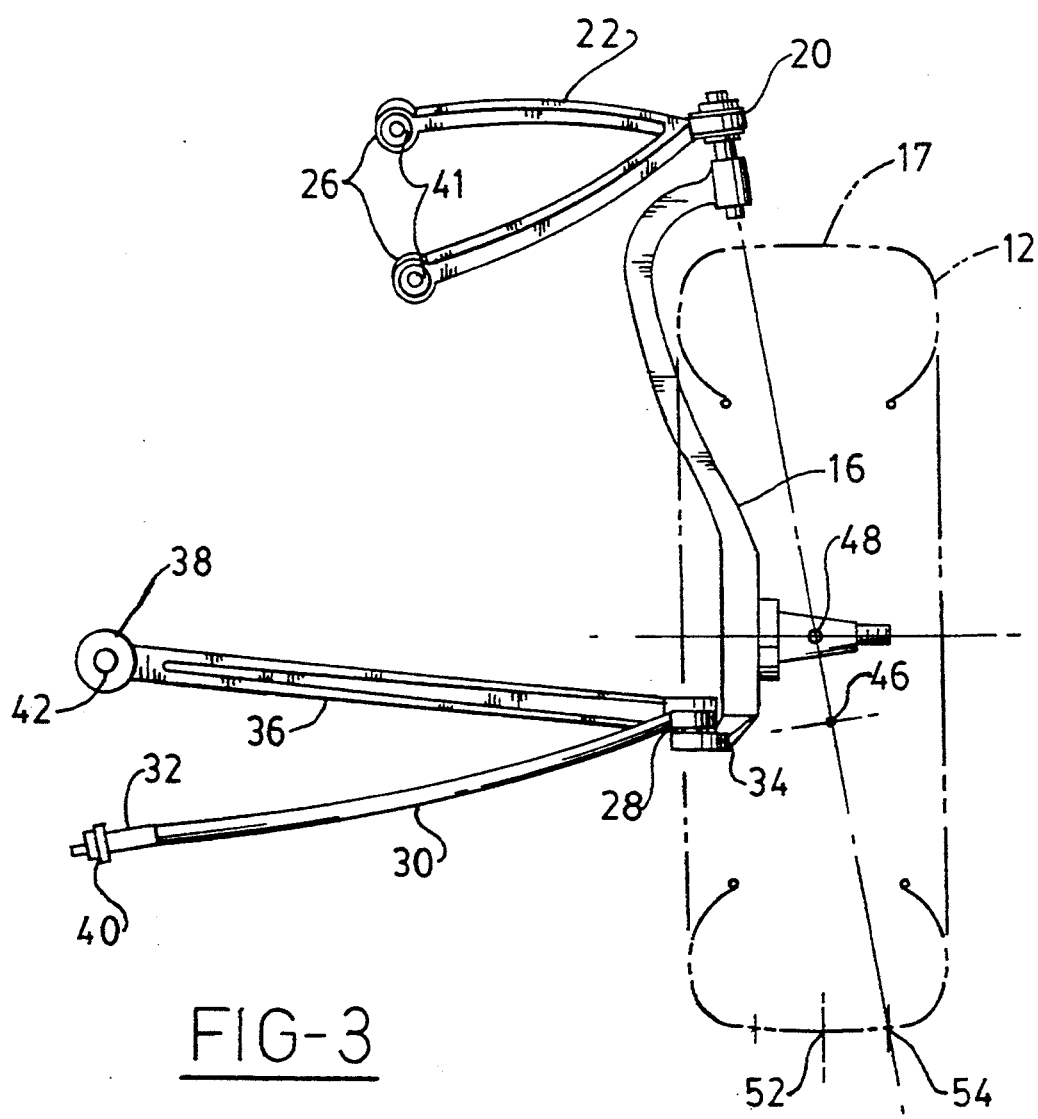
FIG. 3 is a front view of a motor vehicle steerable suspension according to the present invention.

As can be seen in FIGS. 1 and 3, the "tall" knuckle 16 provides an "elevated" attachment point for the upper arm 22 immediately above the tire profile 17. In the present embodiment, this point is approximately one inch above the tire surface and one inch outboard of the inboard edge of the tire profile. The knuckle 16 is pivotally connected to a steering system tie rod by a ball joint. This connection is not shown, but would be located either in front of or behind the spindle centerline. In the preferred embodiment, the tie rod attaches behind the spindle centerline. The tie rod transmits a steering force for steering the vehicle. The knuckle 16 further provides individual attachment points for pivotally connecting a tension strut 30 and a lateral link 36.

As can be seen in FIGS. 1 and 3, the outer arm end 20 of upper control arm 22 connects to the upper part of the knuckle 16 using a ball joint. The upper arm 22 extends inboard from the knuckle 16 to the chassis attachment. This arm may have a single inboard end, or, as in the preferred embodiment, may be bifurcated, thus having tow inner arm ends 26. The bifurcated arm shown provides clearance for other suspension components, such as a coaxial spring and damper assembly (not shown in the drawings). The upper arm 22 attaches to the chassis structure (not shown in the drawings) using rubber mounted bushings 41 at predetermined positions to geometrically determine camber, tread change, roll center height, anti-dive and anti-lift characteristics.

The upper control arm 22 is preferably a single piece, having a single ball joint installed on the outer arm end 20. The use of a single piece arm having a single ball joint attaching the arm to the knuckle provides a less complicated, lower cost, lighter weight alternative to multi-piece arm designs. For instance, the single piece arm 22 reduces the sensitivity of the suspension to dimensional variations as compared to two piece upper arms. These dimensional variations are an inherent aspect of the manufacture and assembly of the components. Further, the use of a single ball joint design simplifies the installation of the upper arm, as it can be done as a single component, thus ensuring installation in the specified design position. Surprisingly, the use of a single piece upper arm 22 unexpectedly reduces the undesirable transmission of vibrations through the steering system.

Figure 2:
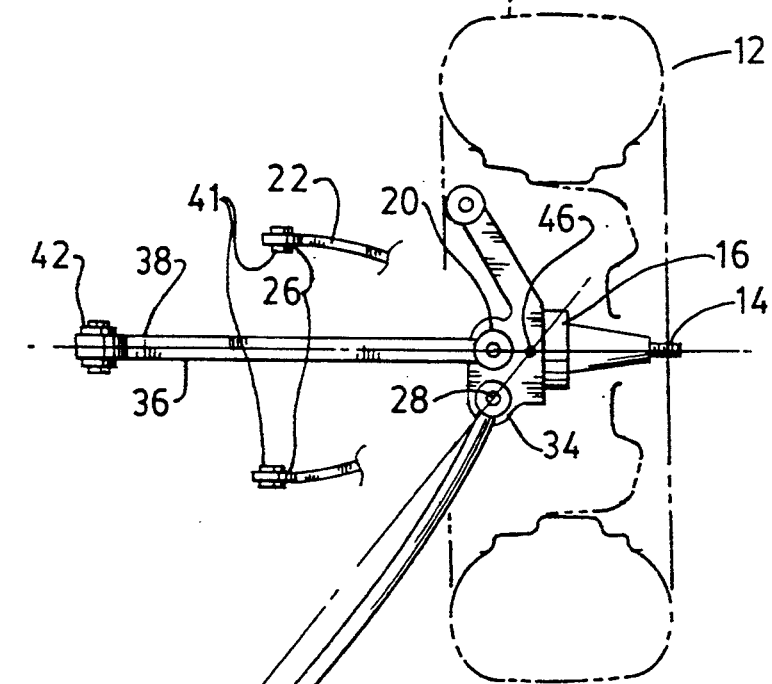
FIG. 2 is a plan view of a motor vehicle steerable suspension according to the present invention.

As can be seen in FIGS. 1-3, a lateral link 36 connects at the outer link end 34 to the lower part of the knuckle 16 using a ball joint. The lateral link 36 extends inward to a point where the inner link end 38 connects to the chassis using a rubber bushing 42. Observation indicates the desirability of positioning the lateral link 36, such that when it is loaded at design load, it is in a substantially horizontal position. Further observations indicate that it is desirable to maximize the length of the lateral link.

Also shown in FIGS. 1-3, a tension strut 30 connects at the outer strut end 28 to the lower part of the knuckle 16, just forward of the outer strut end 28 using a ball joint. It has been determined that it is most desirable to have the outer strut end 28 immediately forward of the outer link end 34. As shown in FIG. 3, the ball joints on the tension strut and the lateral link should be inboard of the upper ball joint. The tension strut 30 extends from the knuckle 16 forward and inboard to the chassis, forming a predetermined angle with the longitudinal axis of the vehicle. The inner strut end 32 connects to the chassis using a rubber isolator 40. The location of this point is determined by the need for anti-dive and anti-lift geometry, combined with the desire to locate the inner strut end 32 and the inner link end 38 so that a line drawn through each attachment point is substantially parallel to the longitudinal axis of the vehicle. The tension strut 30 of the present invention could alternatively be replaced by a compression strut, extending rearward from the knuckle and attaching to the chassis, while maintaining equivalent functionality as a system having a tension strut.

The rubber bushing used for each of the inner connections of the upper arm 22 and the lateral link 36 comprises a typical hollow rubber cylinder. These bushings are bonded to a sleeve having an internal bore and are installed so that the major axis of the bore is generally parallel to the longitudinal axis of the vehicle. The rubber bushing 40 connecting the inner strut end 32 to the chassis is co-axial with the tension strut 30. The inner strut end 32 is threaded to receive a mating fastener to compressively clamp two isolators to a chassis mounting flange. All of these bushings isolate the chassis from high frequency oscillations of the wheel and tire assembly 12, while providing controlled rotational movement between the interconnected members. The use of rubber bushings for attaching suspension components to a vehicle chassis is commonly known to those skilled in the art. Similarly, the ball joints used at the outer connections to the knuckle are of conventional design and familiar to those skilled in the art.

Acting together, the arm 22, strut 30 and the link 36, support the wheel and tire assembly 12 and the knuckle 16 to allow steering of the vehicle, and rebound and jounce motion of the tire and wheel in response to changing surface of the road. The corresponding dynamic forces generated by such motion are transmitted through the knuckle to the various suspension components. The upper control arm 22 reacts longitudinal forces as well as lateral forces. The lateral link 36 primarily reacts lateral loads and the tension strut 30 resists longitudinal loads. Additionally, the suspension attachments provide for alignment adjustments, including camber, caster and toe angles.

When a single piece upper control arm 22 is used in combination with a tall knuckle 16, the inner arm ends 26 may be located further outboard from the vehicle centerline than with a conventional knuckle. This increases available space for engine packaging, while maintaining the same length ratio between upper arm 22 and the lateral link 36. Additionally, as shown in FIGS. 2 and 3, locating the ball joint above the tire, combined with the location of instant center 46 created by the use of a ball jointed link 36 and strut 30 at the lower end of the knuckle 16, allows the suspension to be designed with a zero kingpin offset. As shown in FIG. 3, a line passing from the outer arm end 20 through the instant center 46, defines the kingpin axis. When this line passes through the wheel center 48, the suspension is said to have zero kingpin offset. Furthermore, the intersection point 54 of the kingpin axis and the tire contact patch 50 establishes the scrub radius, and when the intersection is outboard of the center 52, the scrub radius is said to be negative. The present invention, which provides a zero kingpin offset and a negative scrub radius, have several desirable characteristics heretofore unobtainable in a single suspension design using an upper arm 22 having a single upper ball joint. First, the suspension demonstrably reduces the transmission of forces generated by brake roughness, wheel and tire imbalance, and tire force variations into the steering system, and thus significantly enhances the drivers perception of the vehicles interface with the road by reducing the transmission of undesirable vibrations throughout the steering system. Second, the present invention allows the inclusion of a large caster angle while maintaining a small caster trail. This enhances the straight line stability of the vehicle, without undesirably increasing the steering effort necessary to maneuver the vehicle at a variety of speed conditions, including low speed parking. Finally, suspensions designed in accordance to the present invention exhibit nearly ideal Ackerman geometry, thereby providing for minimized tire wear.

Therefore, the present invention provides a new, uncomplicated, low cost and lightweight suspension that provides enhanced tire wear characteristics while providing self-aligning torque to maintain straight line vehicle stability. The suspension design further enhances the driving experience by reducing the undesirable vibrations transmitted through the suspension system into the steering system.

Various other modifications and permutations of the present invention should, no doubt, occur to those skilled in the art. For example, the rubber bushings of the present invention could be replaced by helm joints. Similarly, the ball joints used in the present invention could be replaced by many other devices providing similar rotational flexibility, such as rubber bushings, where the range of motion would otherwise not exceed the limitations of the rubber bushings. Therefore, it is the following claims, including all equivalents, which define the scope of the invention.

We claim:

1. A suspension apparatus for a motor vehicle having a longitudinal axis, a vertical axis and a transverse axis, each being mutually orthogonal, said apparatus being interposed and connecting a chassis to a steerable wheel and tire assembly, said suspension apparatus comprising:
   a tall knuckle having an upper end and a lower end said knuckle being operative to rotatably support said wheel and tire assembly;
   a single upper control arm pivotally interposed between said chassis and said upper end of said knuckle and having an outer arm end and an inner arm end;
   a tension strut pivotally interposed between said chassis and said lower end of said knuckle and having an outer strut end and an inner strut end, said strut extending laterally and rearwardly from said chassis to said knuckle so as to form a predetermined angle between said strut and said longitudinal axis of said vehicle; and
   a lateral link pivotally interposed between said chassis and said lower end of said knuckle and having an outer link end and an inner link end, said link extending from said chassis to said knuckle substantially parallel to the transverse axis of said vehicle as projected both in the horizontal and transverse planes whereby said apparatus is arranged to establish a zero kingpin offset and a negative scrub radius.

2. An apparatus according to claim 1, wherein said outer arm end is pivotally connected to said knuckle by a ball joint and said inner arm end is pivotally connected to said chassis by a rubber bushing.

3. An apparatus according to claim 1, wherein said outer strut end is pivotally connected to said knuckle by a ball joint and said inner strut end is pivotally connected to said chassis by a rubber bushing.

4. An apparatus according to claim 1, wherein said outer link end is pivotally connected to said knuckle by a ball joint, and said inner link end is pivotally connected to said chassis by a rubber bushing.

5. An apparatus according to claim 1, wherein said upper end of said tall knuckle is disposed immediately above said wheel and tire assembly.

6. An apparatus according to claim 1, wherein said upper end of said tall knuckle is disposed further away from the vehicle centerline than said outer strut end and said outer link end when projected onto a horizontal plane.

7. An apparatus according to claim 1, wherein said inner link end and said inner strut end are disposed substantially parallel to said longitudinal axis when projected onto a horizontal plane.

8. An apparatus according to claim 1, wherein said outer link end and said outer strut end are disposed substantially parallel to said longitudinal axis when projected onto a horizontal plane.

9. An apparatus according to claim 1, wherein said link and said strut operatively define an instant center, with a kingpin axis passing therethrough so as to define said zero kingpin offset and said negative scrub radius.

10. A suspension apparatus for a motor vehicle having a longitudinal axis, a vertical axis and a transverse axis, each being mutually orthogonal, said apparatus being pivotally interposed and connecting a chassis to a steerable wheel and tire assembly, said suspension apparatus comprising:
    a tall knuckle, having an upper end disposed above said tire and a lower end;
    an upper control arm having an outer arm end pivotally connected to said upper end of said tall knuckle by a ball joint and an inner arm end pivotally connected to said chassis by a rubber isolator bushing;
    a tension strut having an outer strut end pivotally connected to said lower end of said knuckle by a ball joint and an inner strut end pivotally connected to said chassis by a rubber isolator bushing, said strut extending outwardly and rearwardly from said inner strut end to said outer strut end, and forming a predetermined angle between said strut and said longitudinal axis of said vehicle; and
    a lateral link having an outer link end pivotally connected to said lower end of said knuckle by a ball joint and an inner link end pivotally connected to said chassis by a rubber isolator bushing, said link extending from said inner link end to said outer link end substantially parallel to the transverse axis of said vehicle when projected into both the horizontal and vertical planes, said link being oriented such that an instant center is created relative to said strut so as to allow a kingpin axis having a zero kingpin offset and slight negative scrub radius.

11. A suspension apparatus for a motor vehicle having a longitudinal axis, a vertical axis and a transverse axis, each being mutually orthogonal, said apparatus being interposed and connecting a chassis to a steerable wheel and tire assembly, said suspension apparatus comprising:
    a tall knuckle having an upper end and a lower end, said tall knuckle being operative to rotatably support said wheel and tire assembly;
    a single upper control arm pivotally interposed between said chassis and said upper end of said tall knuckle and having an outer arm end and an inner arm end;

a tension strut pivotally interposed between said chassis and said lower end of said tall knuckle and having an outer strut end and an inner strut end, said strut extending laterally and rearwardly from said chassis to said tall knuckle so as to form a predetermined angle between said strut and said longitudinal axis of said vehicle;

a lateral link pivotally interposed between said chassis and said lower end of said tall knuckle and having an outer link end and an inner link end, said link extending from said chassis to said tall knuckle substantially parallel to the transverse axis of said vehicle as projected both in the horizontal and transverse planes, wherein said link and said strut operatively define an instant center, with a kingpin axis passing therethrough so as to define a zero kingpin offset and a negative scrub radius.

12. An apparatus according to claim 11, wherein said outer arm end is pivotally connected to said tall knuckle by a ball joint and said inner arm end is pivotally connected to said chassis by a rubber bushing.

13. An apparatus according to claim 11, wherein said outer strut end is pivotally connected to said tall knuckle by a ball joint and said inner strut end is pivotally connected to said chassis by a rubber bushing.

14. An apparatus according to claim 11, wherein said outer link end pivotally connected to said tall knuckle by a ball joint, and said inner link end is pivotally connected to said chassis by a rubber bushing.

15. An apparatus according to claim 11, wherein said upper end of said tall knuckle is disposed immediately above said wheel and tire assembly.

16. An apparatus according to claim 11, wherein said upper end of said tall knuckle is disposed further away from the vehicle centerline than said outer strut end and said outer link end when projected onto a horizontal plane.

17. An apparatus according to claim 11, wherein said inner link end and said inner strut end are disposed substantially parallel to said longitudinal axis when projected onto a horizontal plane.

18. An apparatus according to claim 11, wherein said outer link end and said outer strut end are disposed substantially parallel to said longitudinal axis when projected onto a horizontal plane.

* * * * *